(12) United States Patent
Sus et al.

(10) Patent No.: US 8,268,376 B2
(45) Date of Patent: Sep. 18, 2012

(54) TEMPERATURE CONTROLLED FLUID BATH FOOD HOLDING DEVICE AND METHOD

(75) Inventors: Gerald A. Sus, Frankfort, IL (US);
Henry T. Ewald, Roselle, IL (US); Paul G. Simmons, Glen Ellyn, IL (US);
Glenn Schackmuth, Oswego, IL (US);
John J. Mazurkiewicz, Plainfield, IL (US); William J. Reimann, Batavia, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

(21) Appl. No.: 13/066,493

(22) Filed: Apr. 15, 2011

(65) Prior Publication Data
US 2011/0195167 A1    Aug. 11, 2011

Related U.S. Application Data

(63) Continuation of application No. 11/413,385, filed on Apr. 28, 2006, now abandoned.

(51) Int. Cl.
*A47J 39/00* (2006.01)

(52) U.S. Cl. .......... 426/418; 426/79; 426/112; 426/125; 426/395; 426/412

(58) Field of Classification Search .................. 426/418
See application file for complete search history.

(56) References Cited

U.S. PATENT DOCUMENTS

| | | | |
|---|---|---|---|
| 1,092,330 A | 4/1914 | Blake | |
| 2,061,427 A | 11/1936 | King | |
| 1,310,318 A | 3/1970 | Morgan | |
| 3,501,318 A | 3/1970 | Wilson | |
| 3,966,980 A | 6/1976 | McGuckian | |
| 4,384,849 A | 5/1983 | Marchetti | |
| 4,457,702 A | 7/1984 | Marchetti | |

(Continued)

FOREIGN PATENT DOCUMENTS

CA    2279658 A1    2/2000

(Continued)

OTHER PUBLICATIONS

Garden-Robinson; FN-W615, Aug. 2005; Food Freezing Basics: Freezing Poultry and Fish.

(Continued)

*Primary Examiner* — Patricia George
(74) *Attorney, Agent, or Firm* — Ryndak & Suri LLP

(57) ABSTRACT

A method is provided for storing a cooked food in a flexible-walled container having an opening. The method includes placing a quantity of food in a flexible-walled container and submerging at least a portion of the container in a liquid with the opening being located so that liquid does not enter the opening. At least the lower portion of the container is maintained in the liquid and the food is maintained in the container below the surface of the liquid. The liquid collapses the container to seal the container. The temperature of the liquid may be maintained at a non-ambient temperature to heat or cool the food as it is stored. The method may also include storing the food adjacent a work surface, or at a remote main vat and transporting the rack to the work surface at which a serving that includes the food is prepared.

20 Claims, 12 Drawing Sheets

U.S. PATENT DOCUMENTS

| | | |
|---|---|---|
| 4,467,989 A | 8/1984 | Stroh |
| 4,588,154 A | 5/1986 | Basore |
| 4,606,922 A | 8/1986 | Schirmer |
| 4,690,357 A | 9/1987 | Webster |
| 4,715,195 A | 12/1987 | Kucza |
| 4,873,919 A * | 10/1989 | Janssen .................. 99/403 |
| 4,921,193 A | 5/1990 | Benesch |
| 5,203,257 A | 4/1993 | Goad |
| 5,233,969 A | 8/1993 | Koledin |
| 5,243,833 A | 9/1993 | Coelho et al. |
| 5,281,426 A | 1/1994 | Pardo |
| 5,368,093 A | 11/1994 | Takehashi |
| 5,381,729 A | 1/1995 | Hennessy et al. |
| 5,427,340 A | 6/1995 | Stromsmoe et al. |
| 5,556,661 A | 9/1996 | Bezner et al. |
| 5,706,718 A * | 1/1998 | Svensson ................ 99/416 |
| 5,775,649 A | 7/1998 | O'Leary |
| 5,897,805 A | 4/1999 | McClean |
| 5,996,800 A | 12/1999 | Pratt |
| 6,153,232 A | 11/2000 | Holten et al. |
| 6,164,607 A | 12/2000 | Hawkes |
| 6,342,258 B1 | 1/2002 | Berings et al. |
| 6,467,735 B1 | 10/2002 | Clinton |
| 6,748,164 B1 | 6/2004 | Kuzyk |
| 6,809,302 B1 | 10/2004 | Jones et al. |
| 6,957,915 B2 | 10/2005 | Tankersley |
| 2001/0002690 A1 | 6/2001 | Rosky |
| 2003/0021870 A1 | 1/2003 | Pollok et al. |
| 2003/0082069 A1 | 5/2003 | Kuzyk |

FOREIGN PATENT DOCUMENTS

| | | |
|---|---|---|
| JP | 63039567 A | 2/1988 |
| JP | 363039567 A * | 2/1988 |

OTHER PUBLICATIONS

International Searching Authority, International Search Report and Written Opinion, International Application No. PCT/US07/09200, Sep. 11, 2008.

HTTP://DICTIONARY.REFERENCE.COM/BROWSE/SEAL, "seal", dictionary definitions, 4 pages.

* cited by examiner

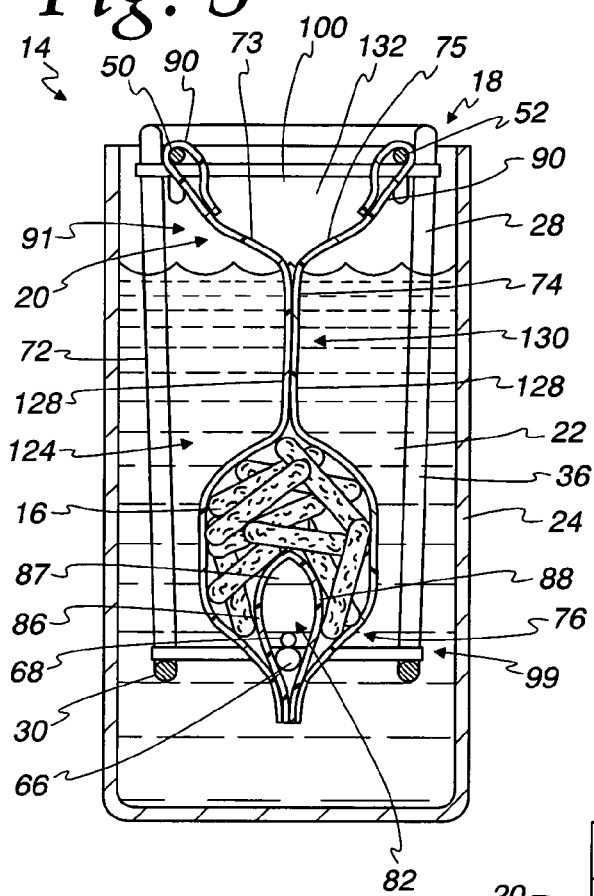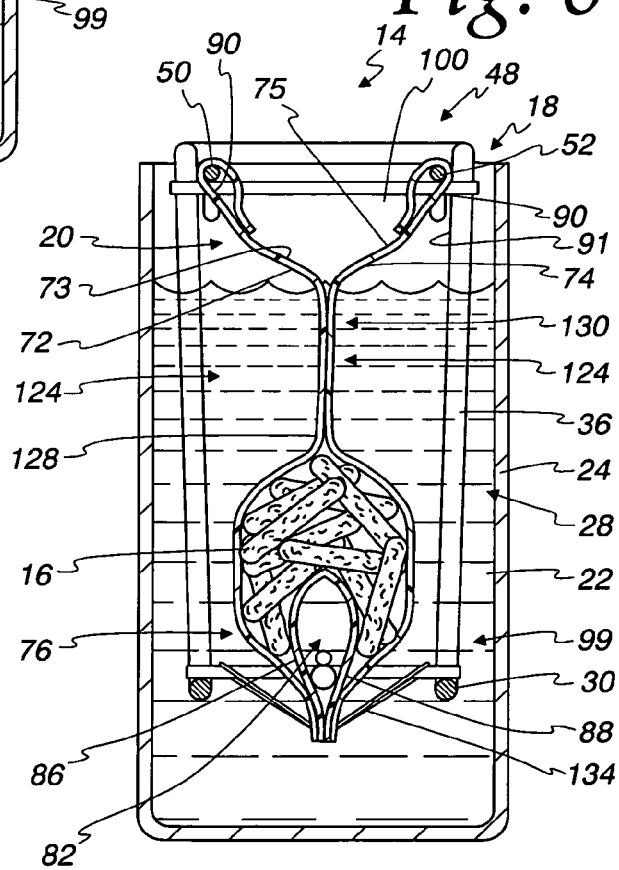

TEMPERATURE CONTROLLED FLUID BATH FOOD HOLDING DEVICE AND METHOD

CROSS-REFERENCE TO RELATED APPLICATION

This application is a continuation of U.S. application Ser. No. 11/413,385, filed on Apr. 28, 2006, currently abandoned, the entire disclosure of which is hereby expressly incorporated by reference.

FIELD OF THE INVENTION

The present invention relates to devices and methods for storing cooked food in a flexible-walled container having an opening. More particularly, the inventive devices and methods store food submerged in a liquid and contained in a container without the liquid entering the opening of the container.

BACKGROUND OF THE INVENTION

Restaurants often serve a relatively large quantity of food in a relatively short period of time, particularly quick-service restaurants. It would be advantageous to store a quantity of cooked food in a manner that makes it readily available for incorporation into a sandwich or other food item to be served, and which maintains the quality of the food for an extended period of storage. Consequently, a need exists for a storage method and device that allows cooked food to be stored at elevated temperature while being readily accessible for use in preparing a food item, which may be a sandwich.

SUMMARY OF THE INVENTION

In accordance with one aspect of the present invention, a method for holding a food product submerged in a fluid contained in a flexible-walled container without direct contact of the food product is provided. In accordance with the method, the container automatically at least substantially seals upon submersion into a fluid bath, thereby sealing the food product contained therein from the ambient atmosphere. The method allows food product to be stored in a fluid bath of a non-ambient temperature to heat or cool the food product as desired while it is being stored. The food product may be stored adjacent a work surface or area so that the food product can be efficiently utilized in preparing a sandwich or other food item at the work surface.

In accordance with the method, a food product is stored in a container that is automatically resealable by hydrostatic pressure in a fluid bath once a user removes a portion of a food product contained in the container.

In accordance with another aspect of the invention, a method is provided for storing a food product in a container that is submerged in a hot water bath and is removable from a hot water bath at one location and is transportable to a hot water bath at a second location.

In accordance with one aspect of the invention, a method for storing a cooked food product in a flexible-walled container having an opening is provided. The method includes placing a quantity of the cooked food in the flexible-walled liquid-impervious container and submerging at least a portion of the flexible-walled container in a liquid with the opening being located so that the liquid does not enter the opening. At least a lower portion of the container is maintained within the liquid. The food is maintained in the container below the surface of the liquid. The fluid is permitted to collapse the container in a location above the quantity of food to seal from the ambient atmosphere the interior volume portion of the container containing the food.

In accordance with another aspect of the invention, the liquid is maintained at elevated temperature relative to ambient temperature (72° F.).

In accordance with another aspect of the invention, the liquid is maintained at reduced temperature relative to ambient temperature.

In accordance with a further aspect of the invention, the container is restrained and prevented from floating upwardly.

In accordance with another aspect of the invention, the food is removed from the container while submerged, such as for use in preparing a sandwich or other food item. Typically the food is removed by using a suitable utensil, such as tongs, inserted into the container opening to separate the collapsed sidewalls of the container and to access and grasp the food contained therein to allow removal of all or a desired portion of the food from the container.

In accordance with a further aspect of the invention, a device is provided for storing food that includes a rack and a flexible-walled container secured to the rack in a manner to prevent the container from floating upward. At least a portion of the rack can be submerged into liquid so that at least the lower portion of the container is maintained within the liquid. The rack permits the opening of the container by insertion of a utensil therein to separate the collapsed sidewalls to access and remove food contained therein while the lower portion of the container is submerged.

In one embodiment of the invention, the liquid is contained in a vat. Typically the vat is positioned at or near a work surface for use in preparing a sandwich or other food item.

In another embodiment of the invention, a first vat is provided at a remote location from a sandwich preparation area. Typically the rack is submerged initially in the first vat at the remote location. The rack, with the container secured thereto and the food placed in the container may be transported from the first vat and submerged in a second vat adjacent the work surface when a supply of food is needed.

In another aspect of the invention, the container is a bag, which can be specially configured for use in accordance with the various aspects of the invention.

In one embodiment of the invention, the bag is secured to the frame and the top of the frame to retain the top of the sidewalls of the bag in a spaced apart open position, while hydrostatic forces seal the bag between top and bottom portions of the bag. The spaced apart open top of the bag provides a user convenient access to the interior of the bag so that the sealed sidewalls may be manually separated by applying an outward force to the sidewalls, such as with a suitable utensil inserted through the bag opening. The food product stored therein can then be removed from the bag with the utensil.

In accordance with another aspect of the invention, the bag has a gusset forming the bottom of the bag, and the bag includes sleeves formed adjacent the top sidewalls and adjacent to the gusset so that the bag is secured to the frame at the sleeves.

In accordance with another aspect of the invention, the frame includes a pivotable mounting member that is pivoted away from the frame to facilitate mounting of the bag to the frame.

In one embodiment of the invention, the frame includes suitably located rods or elongated members that are insertable into sleeves associated with the bag to secure the bag to the frame.

In accordance with another aspect of the invention, the apparatus also includes a vat for holding the bath fluid and the vat may be positioned adjacent a work surface where the submerged food product can be removed from the container in the vat and combined with other food items so as to provide a desired food product, which can be a sandwich.

In another embodiment, the frame includes a handle and is transportable in and out of a vat, and transportable between one vat and another vat, such as a remote holding vat and a vat adjacent a work station for preparing meals.

In accordance with another aspect of the invention, the apparatus includes a heating device. Typically the heating device maintains the temperature of the liquid at a desired elevated temperature which may be about 150° F. or greater.

In accordance with one aspect of the invention, an apparatus for holding a food product submerged in a fluid and contained in a flexible-walled container without direct contact of the food product and the fluid is provided. The apparatus includes a frame having a base, a side support, and a top end. The apparatus also has a flexible-walled container with flexible sidewalls, a closed bottom portion, and an opening in an upper portion of the container to provide access into the interior of the container. The container is mounted to the frame with the container secured to the frame adjacent the opening of the container. The frame acts to maintain the sidewalls of the container in a spaced apart relationship adjacent to the opening of the container to provide convenient access to the interior of the container and the contents stored therein. The container is also secured to the frame to limit movement of the bottom portion of the container in an upward direction such as by a buoyant force that is exerted on the container when submerged in a liquid. The flexible sidewalls of the container are movable inwardly to contact each other at a position intermediate the opening and bottom portion of the container, while the container is secured to the frame. This seals or at least substantially seals the interior of the container from the ambient atmosphere at a location between the opening of the container and the bottom of the container.

In another aspect of the invention, the container includes at least one sleeve adjacent the bottom portion of the container, and the frame has at least one rod. The rod is inserted into the sleeve to secure the container to the frame to limit upward movement of the bottom portion of the container due to buoyancy, when the frame and container are submerged into a fluid.

In another aspect of the invention, the container includes a first sidewall and a second sidewall and the container has a first sleeve positioned along the first sidewall adjacent to the opening of the container. The container also has a second sleeve positioned along the second sidewall adjacent to the opening of the container. In accordance with the invention, the frame for securing the container in a suitable position for immersion in fluid includes a mounting member at the top end of the frame. The mounting member cooperates with the first and second sleeves to secure the container to the frame adjacent the opening of the container. The mounting member may be pivotably mounted at the top of the frame. The mounting member is pivotably moveable between a first position adjacent the frame, and a second position at least partially spaced away from the frame. The second position facilitates mounting the container to the mounting member to secure the container to the frame adjacent the opening of the container.

In another aspect of the invention, a heat exchanging device is provided to maintain the fluid bath at an elevated temperature relative to ambient temperature.

In a further aspect of the invention, a heat exchanging device is provided to maintain the fluid bath at a reduced temperature relative to ambient temperature for storing food that is to be cooled as it is held in the apparatus.

In another aspect of the invention, the food product is stored at a work station for use in preparing a food item that includes the food product. The apparatus includes a work surface for preparing a food serving and a vat positioned adjacent the work surface. The apparatus also includes a frame that is positionable in the vat. A container for holding the food product therein, which can be as described herein, is secured to the frame.

In another aspect of the invention, the apparatus includes at least a second vat, and the frame includes a handle for transporting the frame with the container and the food product placed in the container. Typically, the frame is transported from the first vat to the second vat and at least partially submerged in the second vat.

In a further aspect of the invention, the container is a fluid-impervious flexible bag.

In another aspect of the invention, the apparatus has a bag that includes a gusset forming at least a portion of the bottom portion of the bag. The gusset has a first gusset tab and a second gusset tab, and a section where the first gusset tab is secured to the second gusset tab to form a sleeve. The frame includes a mounting member that is inserted in the sleeve to mount the bag to the frame, and to limit upward movement of the bag when the frame is positioned in the fluid bath.

In another embodiment of the invention, the frame includes a handle on the frame for putting the frame into and out of a vat. The handle on the frame is also used to transport the frame between one vat and another vat, such as between a remote main holding vat and a vat adjacent a work station for preparing food products, which may be sandwiches.

In another aspect of the invention, a rack is provided for holding a flexible-walled container having an open end and a bottom portion. The container is configured for holding therein food submerged in a fluid and contained typically in the lower or bottom portion of the container without direct contact of the food product and the fluid. The rack has a bottom portion and a top portion. A top mounting member is provided for mounting the open, upper end of a container in an open position. The rack also includes at least one lower mounting structure for retaining the bottom portion of a container to prevent upward buoyant movement of the bottom portion of the container when placed in the fluid.

In another aspect of the invention, the rack includes a support surface for supporting a container with a bottom gusset with one gusset tab on one side of the support surface and another gusset tab on the other side of the support surface.

In accordance with one aspect of the invention, a flexible-walled container for holding a food product submerged in a fluid is provided. The container has a top portion having an opening to the interior of the container. The container also has a flexible sidewall and a bottom portion that can include a gusset portion. At least a first attachment structure is positioned proximate the top opening for mounting the top portion of the container. A retaining structure is positioned proximate the bottom portion for restraining the bottom portion of the container to prevent upward buoyant movement of the lower portion of the container.

In accordance with another aspect of the invention, the container has a second attachment structure positioned proximate the top opening for mounting the container and maintaining the opening in an open position, and the container has a second retaining structure positioned proximate the lower portion of the container.

In accordance with another aspect of the invention, the container includes a plurality of retaining structures positioned on the lower portion of the container for preventing upward buoyant movement of the lower portion of the container. Typically, the retaining structures are holes in the container that are positioned in reinforced sections of the container.

In accordance with another aspect of the invention, the sidewall of the container includes a first sidewall and an opposite, second sidewall. The first attachment structure is a sleeve formed on the first sidewall adjacent the opening. The container may have a second attachment structure that can be a sleeve formed on the second sidewall also adjacent the opening.

In accordance with another aspect of the invention, the sidewall of the container includes a first sidewall and an opposite, second sidewall. The first sidewall has a bottom end and the second sidewall has a bottom end. The container also includes a first gusset tab having a bottom end and top end, and a second gusset tab also having a bottom end and a top end. The bottom end of the first gusset tab is located adjacent the bottom end of the first sidewall. Likewise, the bottom end of the second gusset tab is located adjacent the bottom end of the second sidewall. The top end of the first gusset tab is connected to the top end of the second gusset tab.

In accordance with another aspect of the invention, the junction of the top ends of the first and second gusset tabs provides a support surface for supporting the lower end of the container.

In accordance with another aspect of the invention, the container sidewall includes a first sidewall and an opposite, second sidewall. The first sidewall has a bottom end and the second sidewall has a bottom end. The gusset portion includes a first gusset tab and a second gusset tab. The first gusset tab has a bottom end and a top end, and the second gusset tab has a bottom end and a top end. The bottom end of the first gusset tab is positioned against the bottom end of the first sidewall, and the bottom end of the second sidewall is positioned adjacent to the bottom end of the second gusset tab. The top end of the first gusset tab is connected to the top end of the second gusset tab. The interior of the container has a first chamber and a second chamber. The first chamber is positioned between the first sidewall and the first gusset tab. The second chamber is positioned between the second sidewall and the second gusset tab.

In accordance with one aspect of the invention, a flexible-walled container for holding a food product submerged in fluid is provided. The container includes a top portion having an opening to the interior of the container. The container has a first flexible sidewall with an outer surface and an inner surface, and a top end and a bottom end. The container also has a second flexible sidewall having an outer surface and an inner surface, and a top end and a bottom end. The bottom portion of the container includes a gusset portion. The gusset portion has an inner surface and an outer surface. The interior of the container includes a first storage chamber and a second storage chamber in the bottom portion of the container. The first storage chamber is defined by a portion of the inner surface of the first sidewall and the inner surface of a portion of the gusset portion. The second storage chamber is defined by a portion of the inner surface of the second sidewall and the inner surface of a portion of the gusset portion. At least a first attachment structure is positioned proximate the top opening for mounting the top portion of the container and for maintaining the opening in the open position. At least a first restraining structure is positioned proximate the bottom portion for mounting the bottom portion of the container to limit movement of the lower portion of the container when the container is submerged in a fluid.

In accordance with another aspect of the invention, the outer surface of the gusset includes a surface for supporting the container when the support section is placed on a support. The chambers have bottom ends where at least one retaining structure is positioned.

In accordance with another aspect of the invention, a flexible-walled container for holding a food submerged in a fluid and contained in the container without direct contact of the food with the fluid is provided. Such container is automatically sealable upon submersion into a bath of fluid to seal from the ambient atmosphere the food contained therein.

In accordance with another aspect of the invention, a container for storing a food in a fluid bath is provided.

In accordance with another aspect of the invention, a container for storing food products in a hot fluid bath that is conveniently accessible by a user to permit removal of the food products contained in the container is provided. The container is mountable to a rack that can be positioned at a work station so that the food can be used in preparing a food product at the work station.

In accordance with another aspect of the invention, a container is provided for storing a food product in a fluid bath that will automatically at least substantially seal from the ambient atmosphere by hydrostatic pressure of the fluid bath acting on the container after a user finishes removing a portion of a food product contained in the container.

In accordance with another aspect of the invention, an apparatus is provided for storing a food product in a container that is submerged in a hot fluid bath that is removable from the hot fluid bath at one location and is transportable to a hot water bath at a second location.

BRIEF DESCRIPTION OF THE SEVERAL VIEWS OF THE DRAWINGS

FIG. 5 is a side cross sectional elevation view illustrating the sealing of food product in the container and the rack submerged in a vat of liquid to practice the method of the invention;

FIG. 6 is a side cross sectional elevation view illustrating the sealing of food product in the container, with the container and rack submerged in a vat of liquid, and the bottom of the container secured to the rack by a clamp;

DETAILED DESCRIPTION OF THE INVENTION

Figure 2:
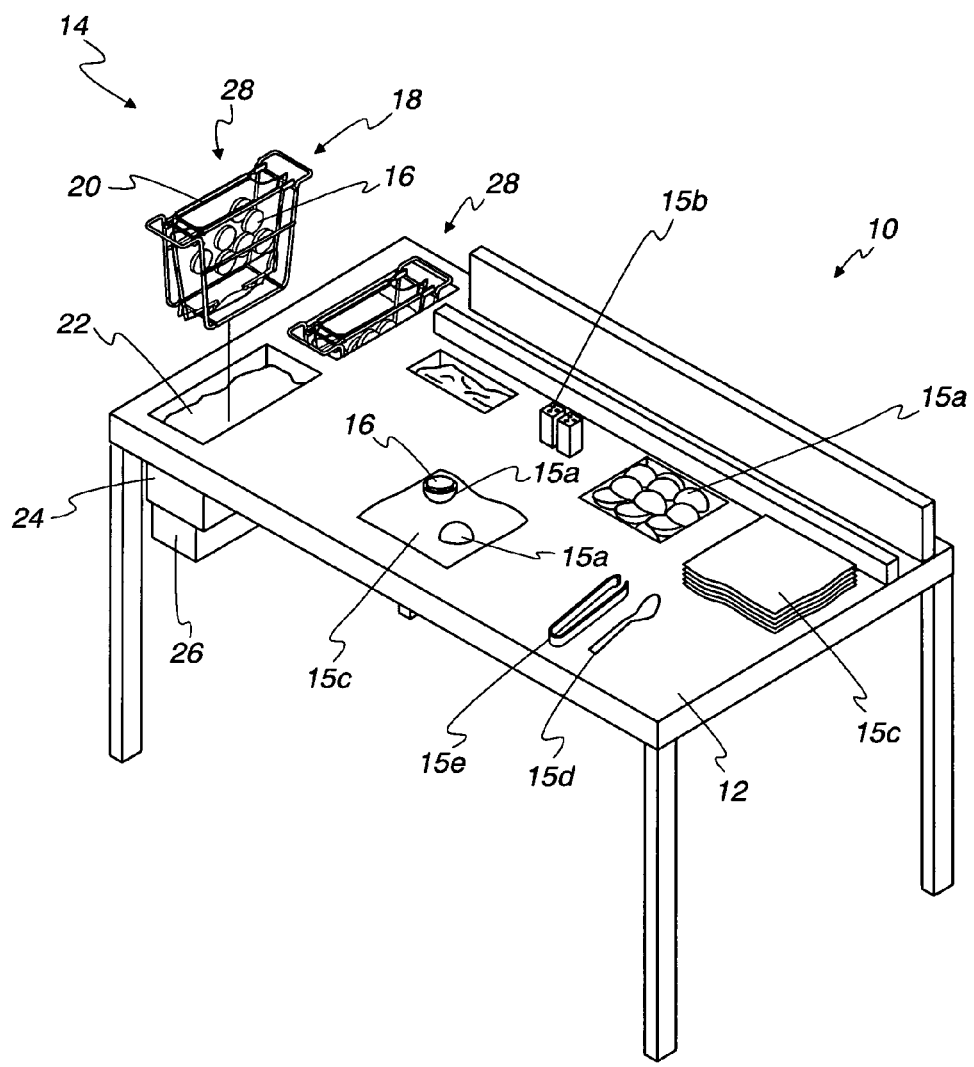
FIG. 2 is a perspective view of the apparatus of the invention positioned at a work station for performing the method of the invention.
Figure 3:
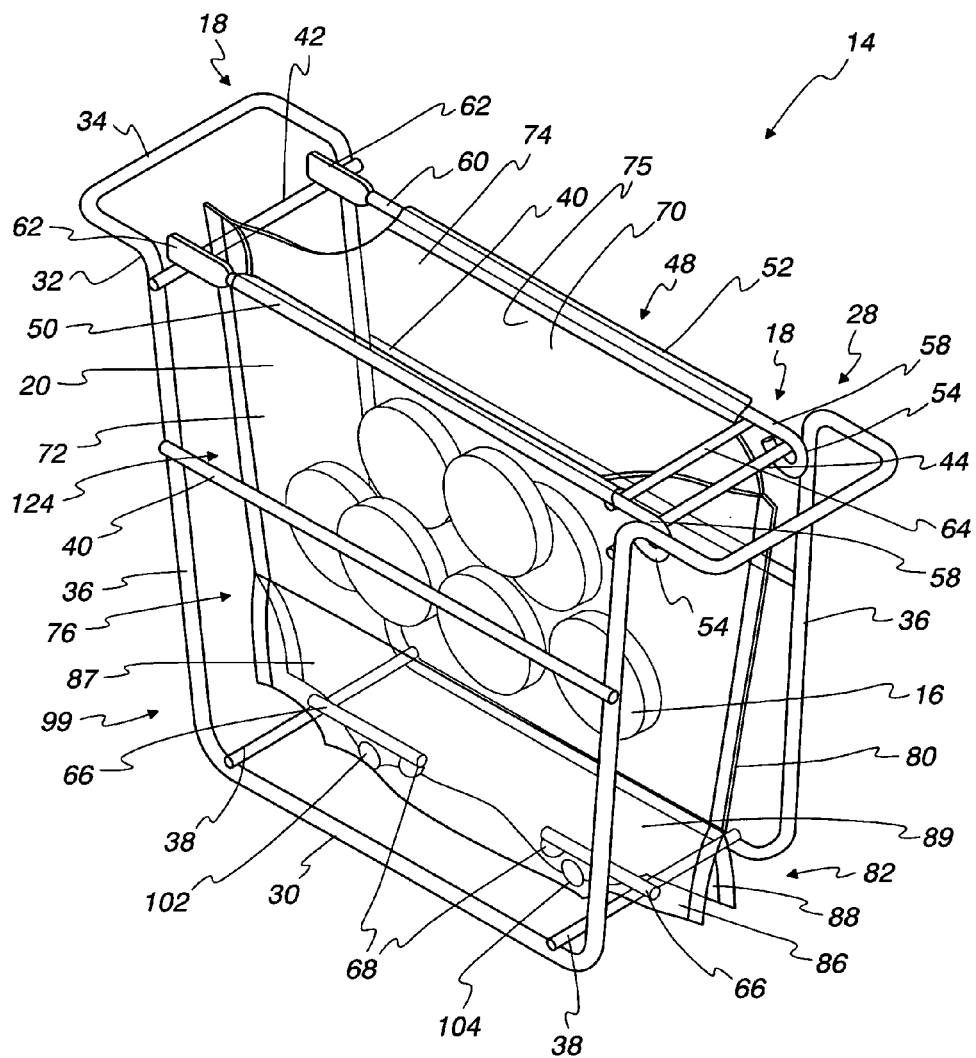
FIG. 3 is a perspective view of the rack and container showing food placed in the container for performing the method of the invention.
Figure 4:
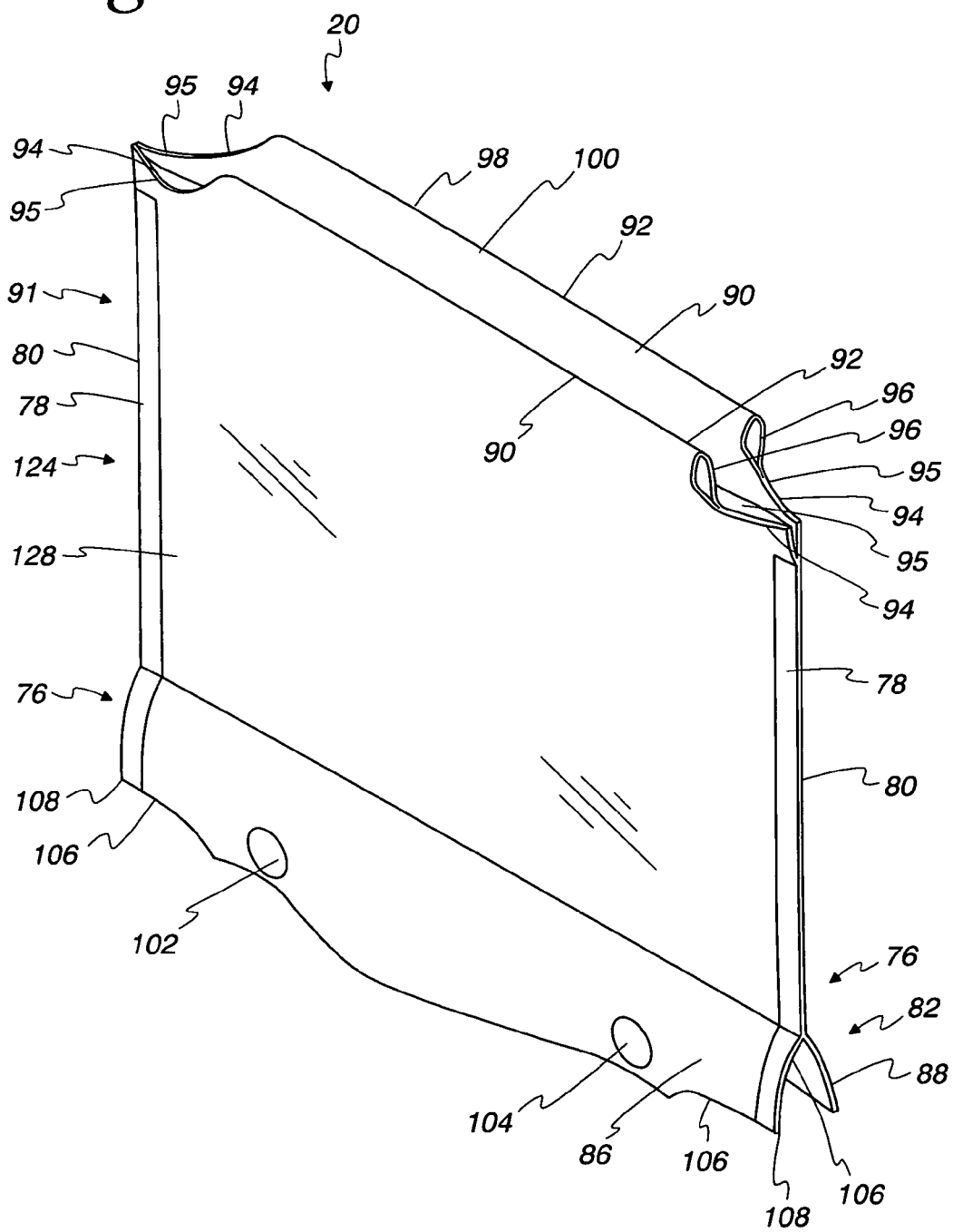
FIG. 4 is a perspective view of one embodiment of a container for practicing the method of the invention.

Referring to the drawings in general, and in particular to FIG. 2, there is illustrated a food preparation work station 10 that includes a food preparation work surface 12 for the preparation and assembly of meals. Positioned adjacent work surface 12 is a food holding apparatus 14 for storing a food, or food product 16, such as, for example, those used in preparing meals sold in a fast-food restaurant. The apparatus 14 includes a rack 18 for holding a flexible-walled container or bag 20 into which food product 16 is placed. Rack 18 and attached bag 20 holding food 16 are submerged in a fluid bath 22. The hydrostatic forces of bath 22 acting on the sidewalls of bag 20 collapse and seal bag 20 from the ambient environment to maintain the organoleptic properties of food 16 contained therein. In this manner, food 16 is prevented from losing excessive moisture during holding periods that may extend for 10, 15, 20, 25, 30 minutes or more. Typically, the fluid of bath 22 will be water but any suitable fluid can be used as desired. The fluid of bath 22 can be heated in any suitable manner. For example, bath 22 may be provided with heat exchanging device 26 to maintain food product 16 at an elevated or a reduced temperature, e.g. greater or less than 72° F. Heat exchanging device 26 may be an electric, gas or otherwise powered heater or refrigeration device, and may be placed outside or within bath 22 to heat or cool bath 22 as desired. Preferably, bath 22 is contained in a vat 24 situated in close proximity to work surface 12, such as, for example, being recessed within work surface 12. Thus, food 16 may be stored close at hand for periodic and rapid withdrawal as required in the preparation of a meal.

Any other items 15a-15e necessary to prepare a desired food item, which may be a type of sandwich, may also be stored at work station 10. Such other items may typically include other food items, such as buns 15a and typical condiments 15b that are added to the food item being prepared. Paper sheets 15c, serving spoon 15d, tongs 15e and other utensils can also be organized at work station 12 to increase efficiency of food preparation. High efficiency in preparing food is especially critical in quick-service restaurants during times of peak sales, such as breakfast, lunch and dinner.

Examples of cooked food products 16 that apparatus 14 may be used to advantageously hold are scrambled eggs, sausage patties, sausage links, grilled chicken breasts, vegetables and the like. Maintaining bath 22 at a temperature in the range of 150° F. to 180° F. typically results in a suitably warm food item for consumption by the customer. Generally speaking, a temperature above 150° F. is desirable to minimize bacterial growth in bath 22 and food products 16 stored in bag 20. Alternatively, in other applications bath 22 may be cooled in any suitable manner, such as by a suitable heat exchanging device 26, or cooled by ice placed in bath 22 to reduce its temperature.

Referring now to FIGS. 3-8, food holding apparatus 14 can be seen in greater detail. Rack 18 has a frame 28 that includes a bottom base 30, a top end 32 and side supports, or columns 36. Frame 28 may also have handles 34 for convenient grasping of rack 18 during transport, and positioning and removing rack 18 from within vat 24. Frame 28 also may have bottom braces 38, column braces 40 and top braces 42, 44 to provide rigidity for frame 28. Rack 18 should have sufficient weight so that the contents of bag 20 do not permit rack 18 to float in bath 22.

Frame 28 may additionally include a top mounting member 48 pivotably mounted to top brace 44. Mounting member 48 includes bag retaining rods 50, 52 each having a loop 54 at ends 58 to mount mounting member 48 to top brace 44. Loops 54 are formed with dimensions suitable to secure rods 50, 52 to top brace 44, while also allowing pivotable movement of rods 50, 52 about brace 44. The opposite ends 60 of rods 50, 52 may be provided with flat tip sections 62 for facilitating mounting bag 20 onto member 48. Flat tip sections 62 extend to overlie top brace 42 to limit the downward pivoting motion of rods 50, 52. Rods 50, 52 may be yoked together by a yoke brace 64 so as to cause rods 50, 52 to pivot in unison. Secured to each of bottom braces 38 is a bag bottom retaining rod 66 that may have a retaining ball 68 attached to the free end of each rod 66.

Bag 20 may be formed with a front sidewall 72 and a rear sidewall 74 that are sealed together along seam 78 at the side edges 80 of bag 20. Bag 20 may also include a bottom gusset 82 that is formed at the bottom 76 of bag 20. Gusset 82 has gusset tabs 86 and 88 that may be spread apart to form an expanded bottom for bag 20 to thereby increase the capacity of bag 20. When gusset 82 is expanded, it also acts to space apart sidewalls 72, 74 to allow for more convenient access to the interior 70 of the bottom portion 76 of bag 20. Bag 20 may be formed from any suitable material, such as a liquid impervious flexible plastic material. Thus, bag 20 provides a watertight container with hollow interior 70 defined by the inner surfaces 73, 75 of sidewalls 72, 74, respectively, and by the inner surface 77 of gusset 82.

Bag 20 may be provided with two sleeves 90 for mounting the top portion 91 of bag 20 to frame 28 of rack 18. Top retaining sleeves 90 are formed adjacent the top edges 92 of sidewalls 72, 74, such as by an inward or outward fold of each of sidewalls 72, 74. After folding over top edges 92, each of edges 92 may be secured to the inner surface of its respective sidewall 72 or 74, such as by heat sealing. For purposes explained later in greater detail, sleeves 90 may also include cut out sections, or voids 94 at the top corners 95 of bag 20.

To mount bag 20 to frame 28, sleeves 90 are slipped over rods 50, 52. During the mounting of bag 20, rods 50, 52 can be pivoted upward to allow convenient access to tip sections 62 of rods 50, 52. Tip sections 62 facilitate insertion of rods 50, 52 into sleeves 90 in two ways. First, since rods 50, 52 are only braced at brace 64, rods 50, 52 may be manually squeezed together, or spread apart, as necessary to align tip sections 62 within the opening to sleeves 90. Secondly, flat tip sections 62 have a flat and reduced cross section that facilitates the insertion of rods 50, 52 into the relatively flat openings 96 of sleeves 90.

It is noted that rods 50, 52 are preferably spaced approximately 2½ inches apart. This spreads apart sleeves 90 to provide an unobstructed opening 100 at the top 98 of bag 20 for the placement and removal of food product 16 within bag 20. Thus, utensils, such as food tongs 15e and spoon 15d, may readily pass between rods 50, 52 and into interior 70 of bag 20. Cut out sections 94 allow bag side edges 80 to extend beyond and beneath top braces 42, 44 to form an elongated generally rectangular shaped access opening 100 to bag interior 70 that is unobstructed between top braces 42 and 44.

Figure 8:
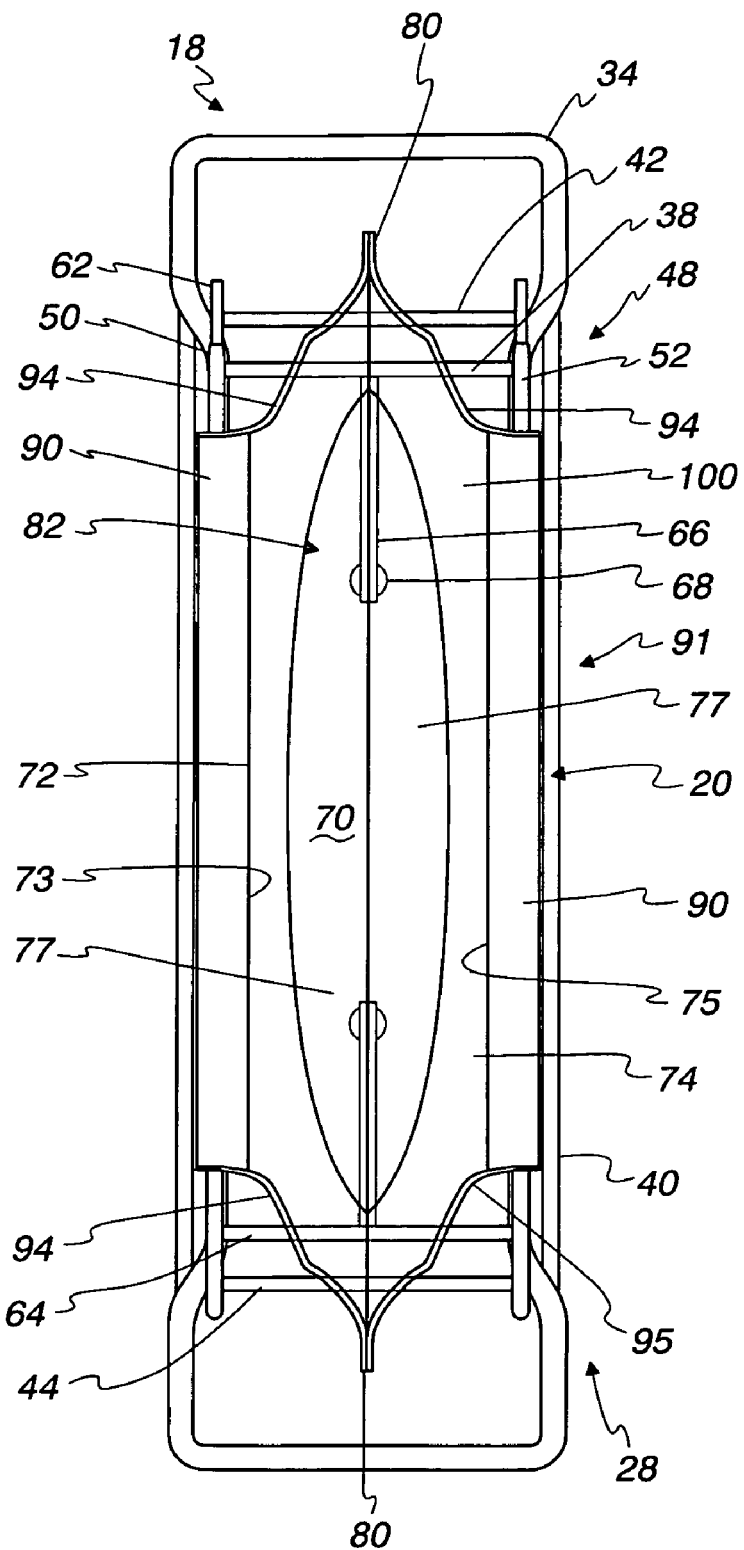
FIG. 8 is a top plan view of the rack with a container mounted thereon, showing the interior of the container of FIG. 3.

Bag 20 is also secured to the bottom portion 99 of frame 28 to prevent upward buoyant movement of bottom portion 76 of bag 20 when placed in bath 22. In one embodiment, bottom portion 76 is provided with bottom restraining sleeves 87 and 89. Sleeves 87 and 89 may be formed between gusset tabs 86, 88 such as by heat sealing gusset tab 86 to gusset tab 88 at sections 102 and 104. When mounting bag 20 to frame 28, each of sleeves 87 and 89 are slipped over one of retaining balls 68 and onto one of bottom retaining rods 66. Cut out sections 106 at bottom corners 108 of gusset tabs 86, 88, allow the bottom of side edge 80 to extend over and beyond base braces 38. As best illustrated in FIG. 8, this prevents bottom side edges 80 from bunching up at braces 38 to hinder access to bottom portion 76 of bag 20.

Figure 7:
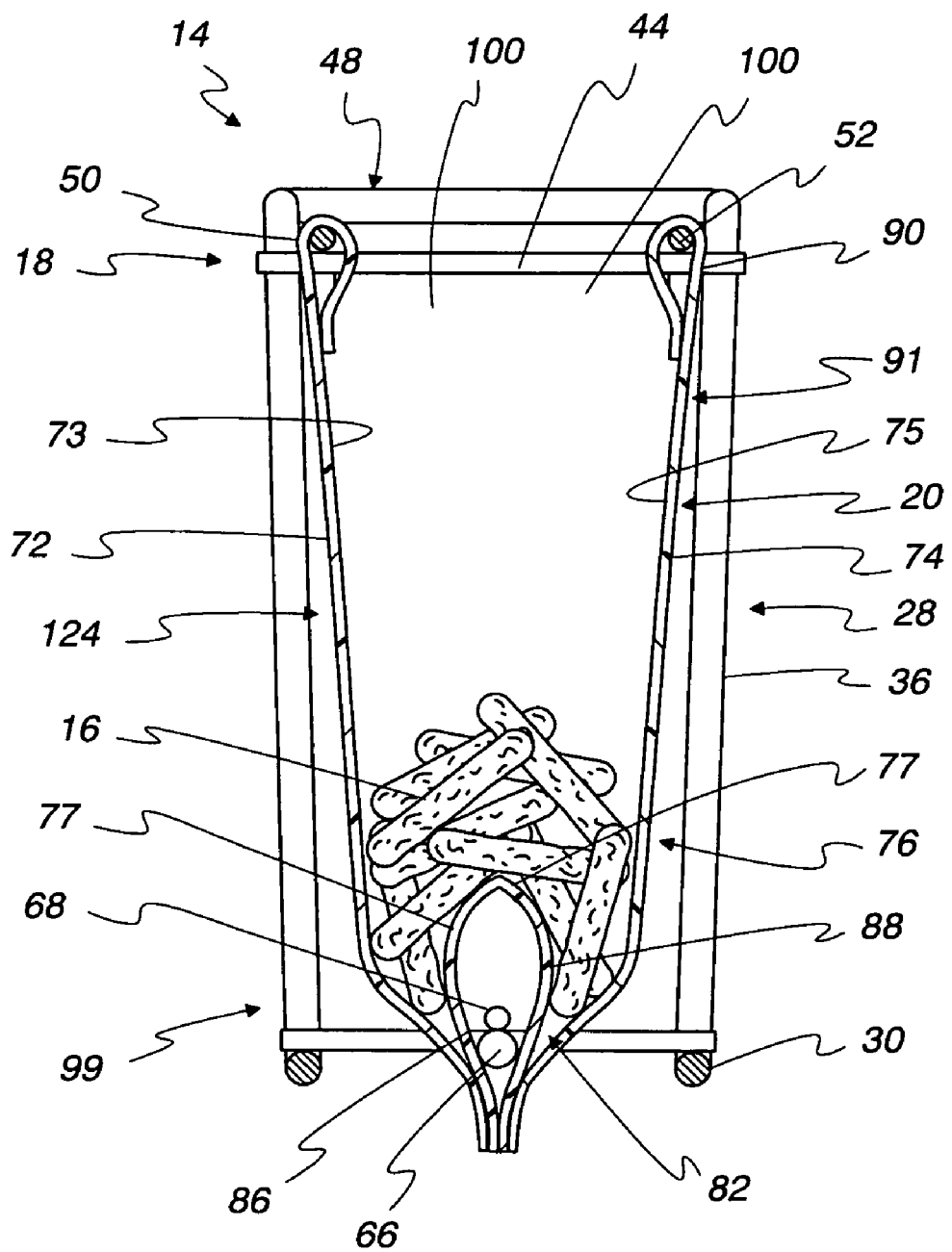
FIG. 7 is a side cross sectional elevation view of the rack and container positioned outside the vat.

Referring now to FIG. 7, there is illustrated a food product 16 contained within flexible bag 20 mounted on rack 18 prior to rack 18 being submerged in fluid bath 22. Sidewalls 72, 74 are held spaced apart at bag opening 100 by spaced apart rods 50, 52 positioned within top sleeves 90. Sidewalls 72, 74 depend downwardly from rods 50, 52 in a spaced apart position. The sidewalls 72, 74 may also be maintained in a spaced apart position at bottom portion 76 of bag 20 by spreading out gusset 82 tab sections 86, 88. With sidewalls 72, 74 of bag 20 spaced apart at top portion 91 and bottom portion 76, the middle section 124 of bag 20 is also spaced apart to provide an open bag interior 70 that is advantageous for quick filling of food product 16.

FIG. 5 illustrates rack 18 inserted in vat 24. It can be seen that bath 22 produces hydrostatic forces that act upon the outer surfaces 128 of a submerged bag 20. This force collapses sidewalls 72, 74 together along a sealing section 130 above food 16. Sidewalls 72, 74 may also collapse against individual pieces of food product 16. This increases heat transfer from bath 22 to food product 16 by increasing the surface area of food product 16 that is directly adjacent hot water bath 22, separated only by bag 20. When placed in bath 22, bottom sleeves 87, 89 act to restrain bag bottom portion 76 to limit the upward movement of bag 20 due to the buoyancy.

Thus, bag interior 70 containing food 16 is sealed or substantially sealed from the external environment to keep food product 16 from losing excessive moisture to the external atmosphere as it is stored for periodic withdrawal. Moisture in food product 16 is retained. In addition to maintaining the organoleptic properties, food product 16 can also be kept warm (or cooled, if desired) for an extended period of time as it is stored prior to use in preparing food products with the stored food. If desired, the interior surface or surfaces of bag 20 may be textured or dimpled so that complete closure of bag 20 does not occur, but rather a limited airspace is provided at least in the area where bag 20 is otherwise sealed to the external atmosphere.

It can also be seen in FIG. 5 that when bag 20 is in the sealed state, a trough-like area 132 appears above sealed section 130. To remove food product 16, a meal preparer can place a utensil, such as tongs 15e, within trough 132. As tongs 15e are moved downward, sidewalls 72, 74 easily separate sealed section 130 to gain access to food product 16 for removal. Thus, food preparation efficiency is increased by providing a supply of food 16 stored on hand at work station 10 for periodic rapid withdrawal as required for use in assembling a meal.

Figure 1:
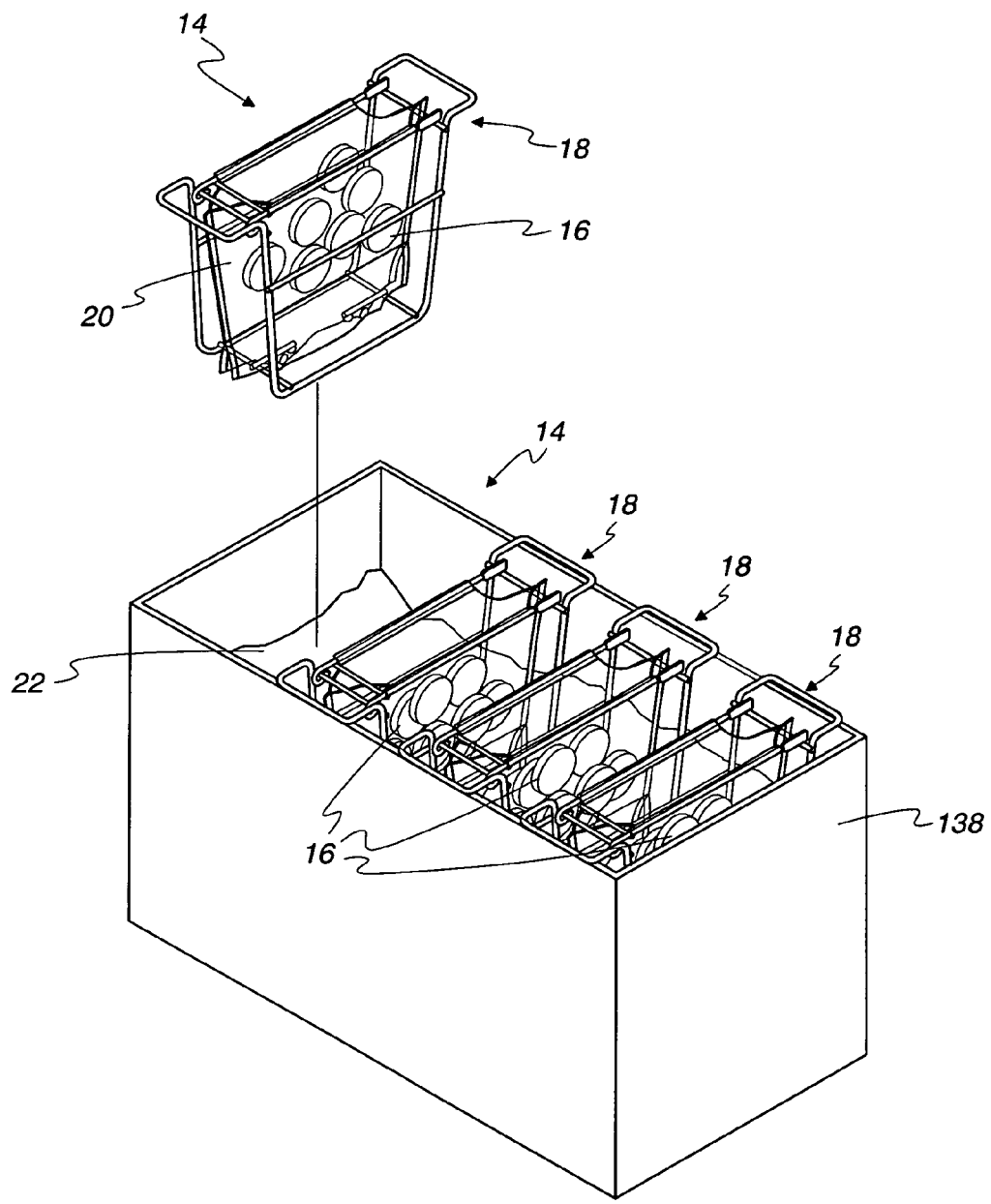
FIG. 1 is a perspective view of a main vat of the invention for holding a plurality of racks for use in performing the method of the invention.

It may also be advantageous to have a second or main water vat 138 (FIG. 1) positioned at a remote location in a kitchen such as adjacent the food product cooking area. The second vat 138 may be similar to vat 24, except that it may be wider to accept a plurality of food racks 18. For example, four food racks 18 can be filled with a food 16, such as precooked sausage patties, and submerged in main hot water vat 138 to provide a ready supply of food product 16 stored in a plurality of racks. When the supply of food product 16 is depleted at work station 10, rack 18 can then be transported from main vat 138 to a vat 24 at work station 10, or other similar work stations within the restaurant.

FIGS. 10-13 illustrate another embodiment of the apparatus for storing a food product 16 that includes a modified frame 150 and a bag 152. Bag 152 is similar to bag 20; however, one difference is that bag 152 provides an alternate means for securing the bottom portion 154 of bag 152 to frame 150. Another difference is that bottom portion 154 provides increased heat transfer between fluid bath 22 and the interior 158 of bag 152, particularly at the bottom portion 154 of bag 152. Bag 152 includes a front sidewall 160 and a rear sidewall 162. Front sidewall 160 has a top end 164 and a bottom end 168, and an inner surface 170 and outer surface 172. Rear sidewall 162 also has a top end 173 and a bottom end 174, and an inner surface 176 and an outer surface 178. Bag 152 has a gusset 180 having a front gusset tab 182 and a rear gusset tab 184. The bottom end 188 of front gusset tab 182 is joined to the bottom end 168 of front sidewall 160, and the bottom end 190 of rear gusset tab 184 is joined to the bottom end 174 of rear sidewall 162. Unlike gusset 82 of bag 20, gusset 180 of bag 152 and gusset tabs 182 and 184 are not joined together to form sleeves 87, 89.

As described below, bag 152, like bag 20, may be formed from a single sheet of material. Bag 152 may also be formed by joining together individual sheets by any suitable means such as heat sealing. Typically, bag 152 is heat sealed along margins 192 to seal and/or reinforce the edges of bag 152, except for open end 194 of bag 152, as shown in FIG. 10.

Frame 150, like frame 28, has a base 30, columns 36, and top 32 including mounting member 48. Frame 150 also has a bag support 198 attached to cross braces 38. Bag support 198 may include sides 200 and top 202. Frame 150 also includes a plurality of mounting members, or balls 196 attached to the frame base 30.

Figure 10:
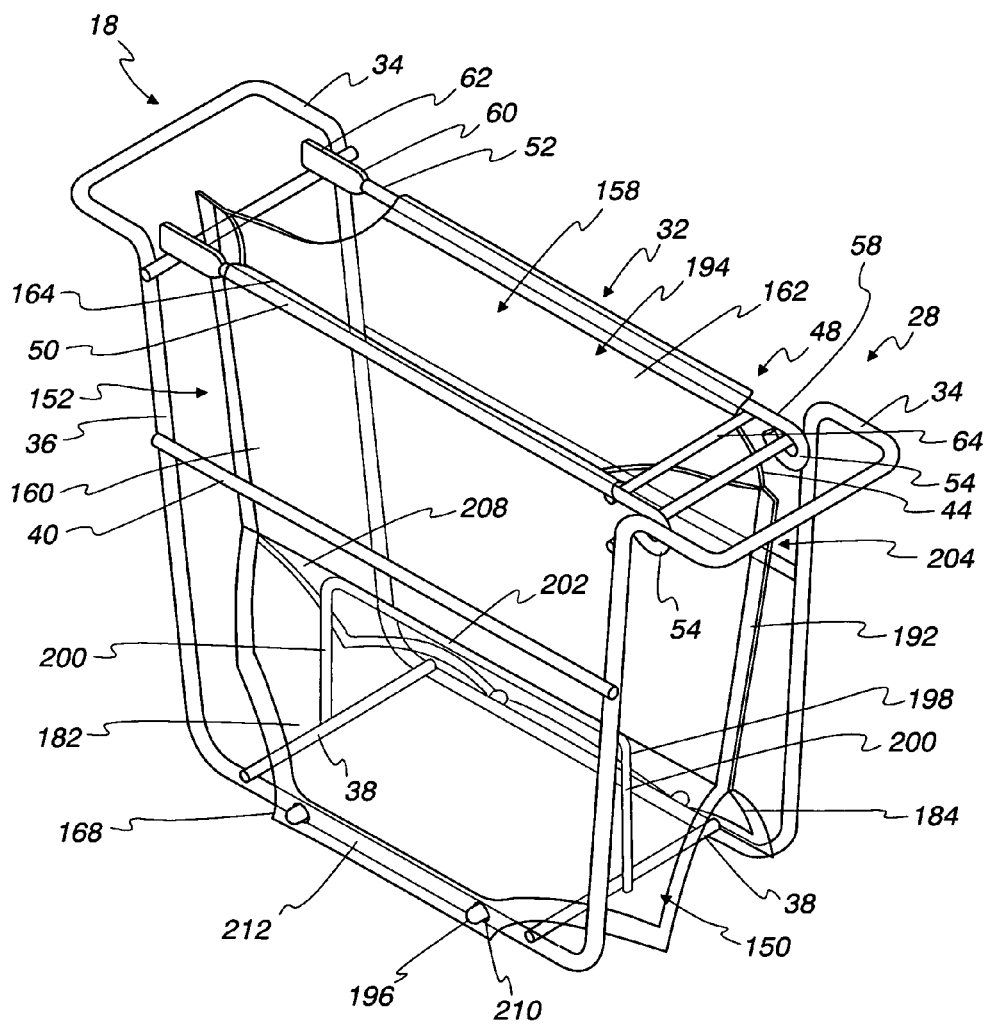
FIG. 10 is a perspective view of another embodiment of a rack and a container for practicing the method of the invention.
Figure 11:
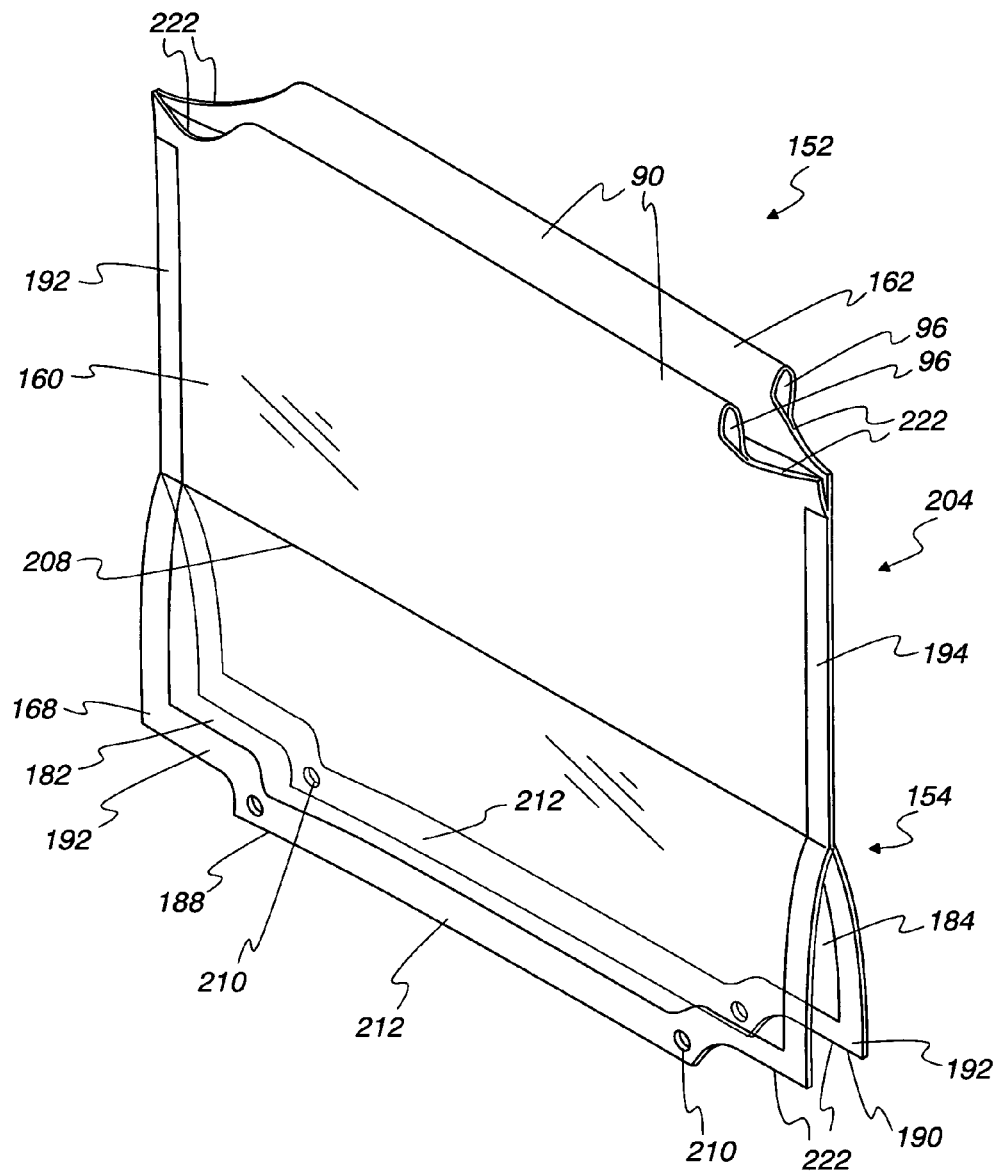
FIG. 11 is a perspective view of the container of FIG. 10.

FIG. 10 best illustrates bag 152 mounted to frame 150. The sleeves 90 of bag 152 are positioned over mounting member 48 to mount the top portion 204 of bag 152. The juncture 208 of front gusset tab 182 and rear gusset tab 184 is positioned over bag support top 202. Gusset tabs 182 and 184 depend downwardly to be positioned on opposite sides of support top 202. Front and rear gusset tabs 182, 184 include one or more holes 210 adjacent bottom ends 188, 190, respectively. Holes 210 cooperate with balls 196 to restrain bottom portion 154 of bag 152 to thereby prevent upward buoyant movement of bottom portion 154 of bag 152. Preferably, holes 210 are positioned in the lower margin 212, since lower margin 212 of bag 152 in an area of increased strength, due to the heat sealing of sidewalls 160, 162 to gusset tabs 182, 184 respectively.

Figure 12:
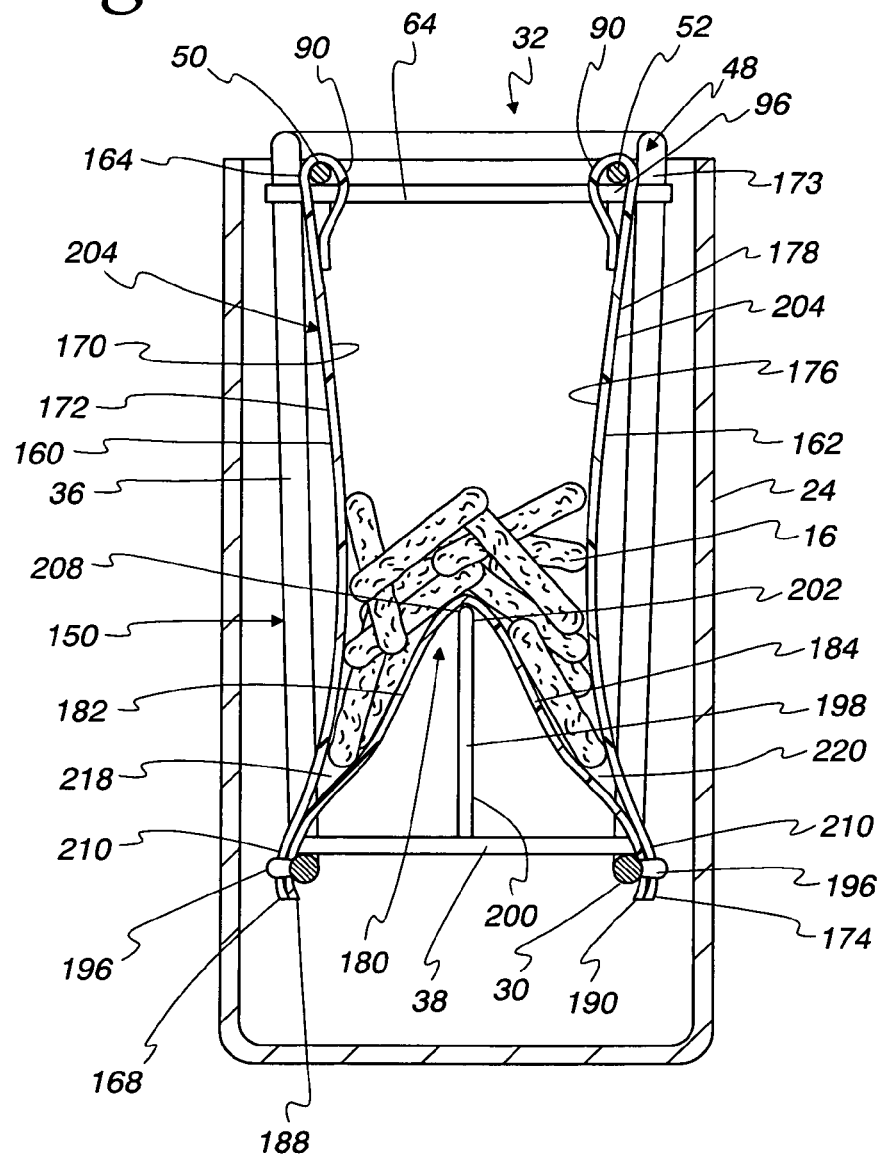
FIG. 12 is a cross sectional side elevation view of the container and rack of FIG. 10 placed in an empty vat.
Figure 13:
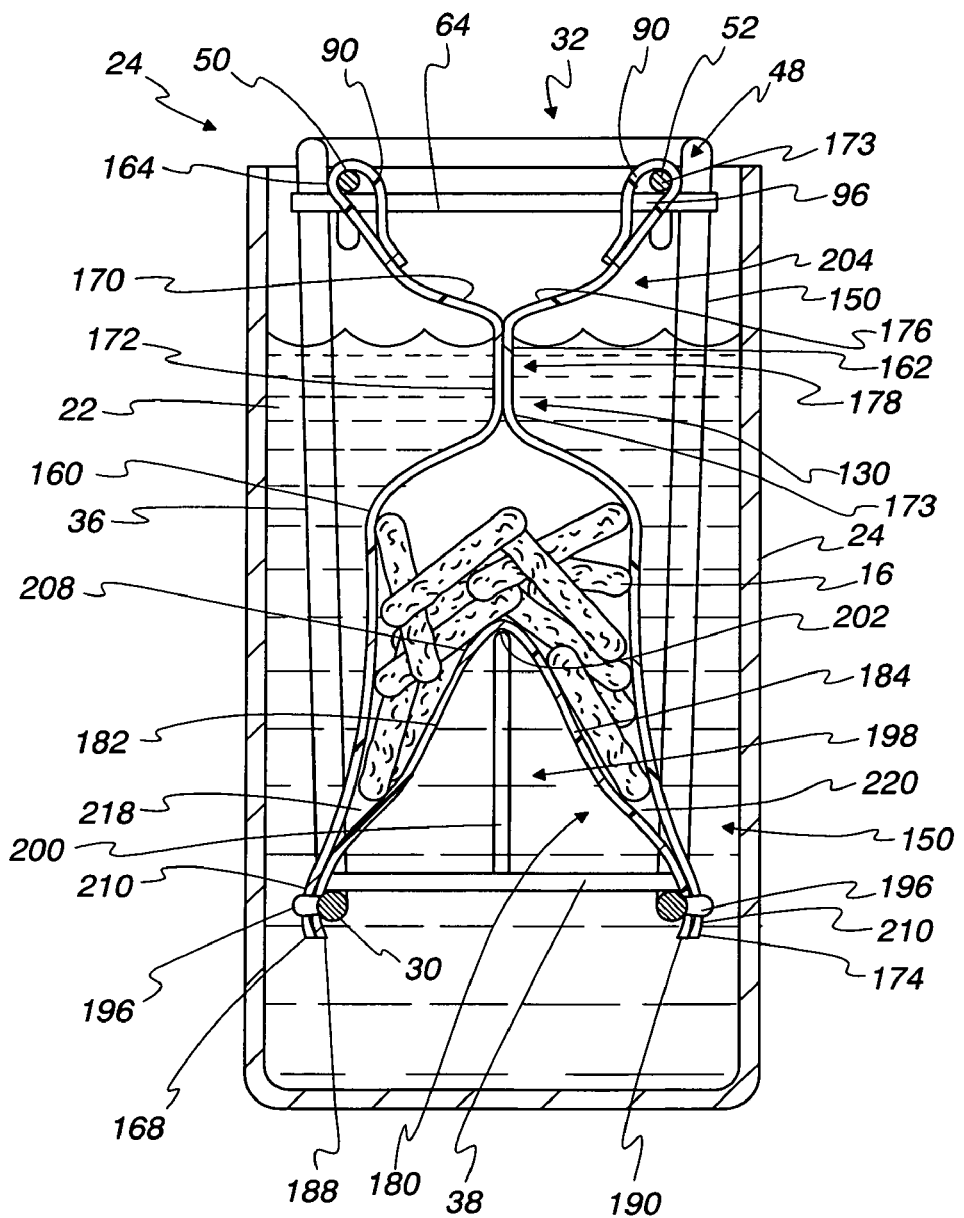
FIG. 13 is a cross sectional side elevation view of the container and rack of FIG. 10 placed in a vat with a liquid bath, showing the container sealed by hydrostatic pressure.

FIGS. 12 and 13 illustrate the increased heat transfer for bottom portion 154 of bag 152. Gusset tabs 182 and 184 are spaced apart along their entire length to provide greater surface area contact with bath 22. Also, gusset tabs 182, 184 form chambers 218, 220, respectively, where food 16 may be located to be nearer to bath 22, as compared to bag 20. The spaced apart gusset tabs 182, 184 of bag 152 increase circulation between gusset tabs 182, 184 to further increase heat transfer to food 16.

Figure 9:
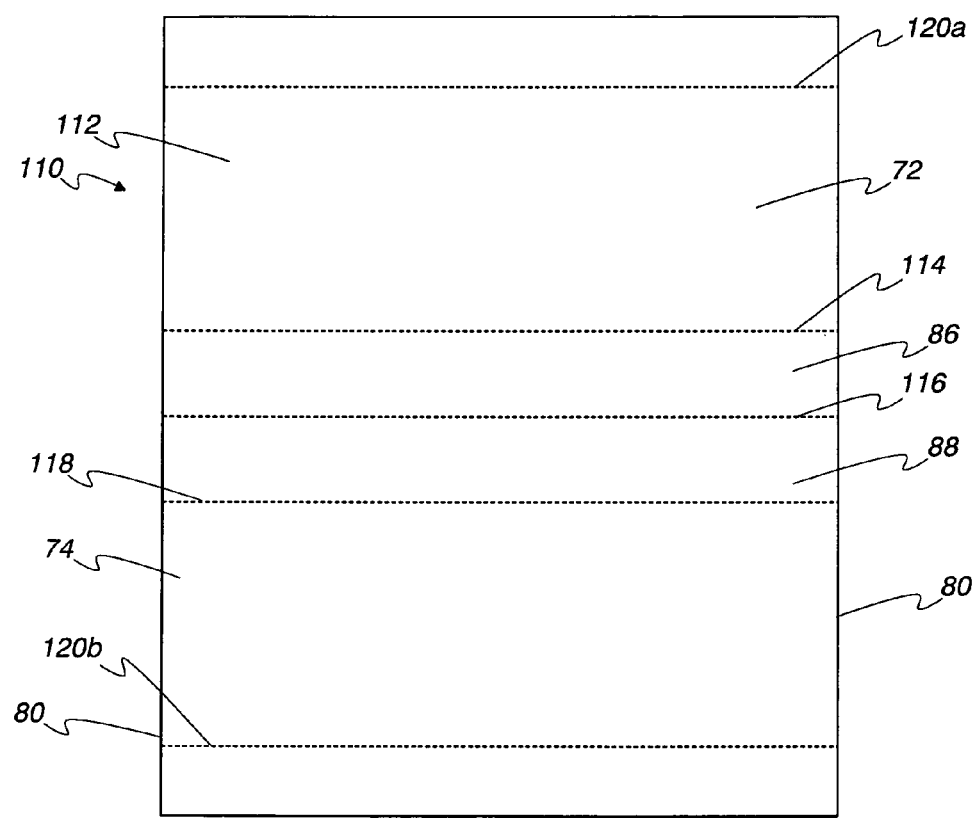
FIG. 9 is a top plan view of a sheet of material illustrating the fold lines for folding the sheet into a container for practicing the method of the invention.

Referring to FIG. 9, it is schematically illustrated how bag 20 or bag 152 may be formed by folding a single sheet of material 110. Sheet 110 is folded to form sidewalls 72, 74, gusset 82 and sleeves 90 of bag 20. The inner surface 112 of sheet 110 is folded inwardly along line 114 to form front sidewall 72, outwardly folded along line 116 to form gusset 82, and inwardly folded along line 118 to form rear sidewall 74. Top sleeves 90 are formed by inward folds along lines 120. Alternatively, sheet 110 may be folded outwardly along lines 120a and 120b to form sleeves 90.

In a like manner, sheet 110 can be folded to form bag 152. The inner surface 112 of sheet 110 is folded inwardly along line 114 to form front sidewall 160, outwardly folded along line 116 to form gusset 180, and inwardly folded along line 118 to form rear sidewall 162. Top sleeves 90 are formed by inward, or alternatively outward, folds along lines 120a and 120b. Additionally, margins 192 may be heat sealed and provided with holes 210. Bag 152 may also be provided with voids or cut out sections 222 to complete bag 152.

In another embodiment of the invention, food holding apparatus 14 uses alternate means to secure bag 20 to frame 28, or to secure bag 152 to frame 150. As shown in FIG. 6, a clamp 134 is utilized to clamp bag 20 to frame 28. One or more clamps 134 may be used at frame base 30, side support 36, and/or top 32. By using clamps 134, lower sleeves 87, 89 are not required for bag 20. Bag 20 could also be held down by placing a weight (not shown) in the bottom of bag 20, or attaching a weight to the bottom of bag 20. By using clamps 134 to clamp the top of bag 20 to rods 50, 52, upper bag sleeves 90 could also be eliminated. Likewise, clamps 134 may be utilized in place of holes 210 and/or sleeves 90 of bag 152 to mount bag 152 to frame 150.

Apparatus 14 of the present invention need not be limited to the use of storing food products at work station 12. Apparatus 14 may be situated at any other desirable location. For example, apparatus 14 may be located at a buffet table and used to maintain the freshness of the food product at a buffet serving table. Apparatus 14 may also be provided with a heating device 26 for a vat 24 positioned at a buffet table, to heat or cool bath 22 and food product 16.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A method of storing cooked food in a liquid impervious, flexible-walled container in a liquid while periodically removing at least a portion of the stored cooked food from the container while the container remains in the liquid and the liquid automatically seals the container to seal the stored cooked food and reseals the container after removing a portion of the stored cooked food to seal remaining stored cooked food, the liquid impervious, flexible-walled container having at least two generally opposed flexible sidewalls, a closed bottom portion, an interior, and an opening in an upper portion suitable for providing access into the interior of the container for placing the cooked food into the interior of the container and for removing the cooked food from the interior of the container, the generally opposed sidewalls extending adjacent the opening, comprising:

mounting the container to a rack to place and maintain by the rack the opposed sidewalls adjacent the opening spaced apart to provide substantially unobstructed manual access through the opening into the interior of the container;

placing a quantity of the cooked food to be stored through the opening of the container into the interior of the liquid impervious, flexible-walled container while the rack maintains the opposed sidewalls adjacent the opening spaced apart to provide the substantially unobstructed manual access to the interior of the container;

submerging at least a portion of the flexible-walled container mounted on the rack in a liquid with the opening being located so that the liquid does not enter the opening;

maintaining at least a lower portion of the container within the liquid;

maintaining the stored food in the container below the surface of the liquid;

maintaining by the rack the substantially unobstructed manual access through the opening of the container while permitting the liquid to collapse the opposed sidewalls of the container to contact each other in a location above the quantity of stored food to form a separable seal caused by the hydrostatic forces of the liquid that at least substantially seals the portion of the container containing the stored food from the external atmosphere, the at least substantially sealed portion being readily unsealed by manually accessing the seal through the unobstructed manual access at the opening for separating the opposed sidewalls at the location of the seal; thereafter maintaining the opposed sidewalls in the upper portion of the container above the collapsed contacting sidewalls forming the separable seal spaced apart by the rack to thereby provide the unobstructed manual access through the opening to the separable seal while the container is in the liquid and while storing the food in the container below the separable seal to thereby substantially seal the stored food from the atmosphere; thereafter manually accessing the separable seal through the opening and the substantially unobstructed manual access maintained by the rack while the container is in the liquid and separating the flexible sidewalls to unseal the container while the container is in the liquid and while maintaining the opposed sidewalls adjacent the opening spaced apart by the rack to allow manual access for manually separating the separable seal and to allow access for the removal of the stored food through the opening of the container while the container is in the liquid; and thereafter manually removing through the unobstructed manual access at the opening at least a portion of the stored food from the interior of the container while the container remains in the liquid.

2. The method of claim 1 further comprising maintaining the liquid at elevated temperature above ambient temperature and the separable seal prevents the entrance of gases from the atmosphere past the separable seal and into the interior of the container.

3. The method of claim 1 further comprising maintaining the liquid at reduced temperature below ambient temperature and the separable seal prevents the entrance of gases from the atmosphere past the separable seal and into the interior of the container.

4. The method of claim 1 further comprising maintaining the flexible-walled container in a position that permits the collapsing and sealing of the container by preventing the container from floating upwardly.

5. The method of claim 1 further comprising maintaining the flexible-walled container in a position that permits the collapsing and sealing of the container by preventing the container from floating upwardly to the surface of the liquid.

6. The method of claim 1 wherein the container has a top end, a first side edge, and a second side edge, and the opening at the top end extends along the top end and is located between the first and second side edges and further comprising:

permitting the liquid to collapse the opposed sidewalls together along a junction, the junction having a top edge extending substantially from the first side edge to the second side edge to form the separable seal to thereby seal the stored cooked food below the junction from fluid communication with the atmosphere;

maintaining the upper portion of the opposed sidewalls spaced apart by the rack for the portion of the container that extends from between the top of the junction of the separable seal to the opening at the top end of the container to thereby provide an access through the opening for facilitating separating the separable seal and to facilitate removal of food from the interior of the container in the liquid;

after said removing, again permitting the liquid to recollapse the opposed sidewalls of the container in a location above the remaining quantity of stored food to again form a separable seal caused by the hydrostatic forces of the liquid that seals the portion of the container containing the remaining stored food from the external atmosphere, the at least substantially sealed portion being readily unsealed by separating the opposed sidewalls at the location of the seal; thereafter continuing to maintain the opposed sidewalls of the container in the collapsed sealed position and continuing to store the remaining food in the sealed portion of the container while maintaining at least the lower portion of the container in the liquid; and thereafter unsealing and opening the container while at least the lower portion of the container is maintained in the liquid to remove at least a portion of the remaining stored food from the container.

7. The method of claim 1 wherein:

the rack includes a bottom portion and a top portion, the top portion having a first mounting surface and second mounting surface spaced from the first mounting surface, the first and second mounting surfaces for mounting the sidewalls of the container adjacent the opening in a spaced apart relationship;

the at least two generally opposed flexible sidewalls include a first sidewall, a second sidewall generally opposed to the first sidewall, and each of the first and second sidewalls includes a first side edge and second side edge, the first and second sidewalls extending between their respective first and second side edges;

the container is secured to the rack to limit movement of the bottom portion of the container in an upward direction;

the opposed sidewalls of the container are movable inwardly to contact each other for forming the separable seal at a position between the opening and bottom portion of the container while the container is secured to the frame to seal the interior of the container between the opening of the container and the bottom of the container and above the food that is placed in the container; and the method further comprises;

attaching the first sidewall adjacent the opening to the first mounting surface on the rack, and attaching the second sidewall adjacent the opening to the second mounting surface to thereby space the first sidewall from the second sidewall along substantially the entire distance between the first side edges and the second side edges of the first and second sidewalls; and manually separating the collapsed opposed sidewalls of the container by accessing the collapsed opposed sidewalls through the opening and removing a portion of the food stored in the container while at least the lower portion of the container remains submerged in the liquid.

8. The method of claim 6 further comprising using a utensil to separate the collapsed opposed sidewalls and to grasp the food to remove the food from the container.

9. The method of claim 1, wherein the opposed sidewalls include a first sidewall and a second sidewall opposed to the first sidewall with each of the first and second sidewalls having an upper portion adjacent the opening, and the rack has an upper portion including a first retaining rod and second retaining rod, each of the first and second retaining rods having first ends and second ends, the first ends of the retaining rods movable between a first relative spaced apart position and a second relative spaced apart position whereat the first ends of the retaining rods are closer together than when at the first relative position, and the second ends of the retaining rods are spaced apart in a substantially fixed position; and the method further comprises:

moving of the first ends of the first and second retaining rods from the first relative spaced apart position to the second relative spaced apart position to facilitate the attachment of the upper portion of the container to the rods;

attaching while the first ends of the retaining rods are in the second relative spaced apart position the upper portion of the first sidewall to the first retaining rod and attaching the upper portion of the second sidewall to the second retaining rod; thereafter allowing the first ends of the first and second retaining rods to return to the first relative spaced apart position to thereby allow the first and second sidewalls adjacent the opening to be placed in a spaced apart relationship to provide access to the interior of the container when placing the cooked food into the container and when removing the cooked food from the container and for providing access to the separable seal when separating the separable seal when the container is in the liquid;

attaching and securing the container to the rack to prevent the container from floating upwardly when the rack is submerged in the liquid; and submerging at least a portion of the rack into the liquid so that at least the lower portion of the container is maintained within the liquid.

10. The method of claim 9 wherein at least one of the first and second retaining rods is flexible and the method further comprises: flexing at least one of the retaining rods to move the first ends of the retaining rods from the first relative spaced apart position to the second relative spaced apart position when securing the container to the rack and thereafter releasing the at least one flexed retaining rod to automatically return the first ends of the retaining rods to the first relative spaced apart position to place and maintain the first and second sidewalls adjacent the opening of the container in an open position above the sealed portion of the container containing the food and to provide a trough at the opening so that a utensil may be inserted into the trough and into the interior of the container to separate the collapsed container wall to open the sealed portion of the container to remove the food from the previously sealed portion of the container.

11. The method of claim 10 further comprising containing the liquid in a vat, the container when mounted to the rack and the at least a portion of the container is submerged in a liquid to store the cooked food in the interior of the container, the interior of the container is maintained to have a width between the spaced apart opposed sidewalls that does not exceed the width of the opening of the container in the upper portion of the container between the retaining rods when the first and second flexible rods are allowed to return to the first relative spaced apart position, whereat the retaining rods are un-flexed and the retaining rods are spaced apart to maintain the width of the opening in the upper portion of the container between the retaining rods to thereby facilitate the manual removing through the opening of stored food wherein when the retaining rods are in the first relative spaced apart position the sidewalls are allowed to collapse together to contact each other to seal the container by forming the separable seal.

12. The method of claim 11 further comprising:
providing a work surface; and
positioning the vat adjacent the work surface.

13. The method of claim 12 further comprising;
positioning the vat in a kitchen;
providing a second vat positioned at a remote location in the kitchen, the vat containing a liquid therein;
submerging at least a portion of the rack in the second vat so that at least the lower portion of the container is submerged in the liquid contained in the second vat;
removing the rack and the container secured thereto from the second vat;
transporting the rack and the container storing the food product to the first vat;
and thereafter submerging at least a portion of the rack at the first vat adjacent the work surface.

14. The method of claim 6 further comprising combining the food removed from the container with a second food item after removing the food from the container.

15. The method of claim 1 further comprising the container being a flexible-walled bag having an opening along a top edge of the container.

16. The method of claim 15 further comprising the container being a flexible-walled bag and at least a portion of one of the opposed sidewalls collapses against the other opposed sidewall to seal the bag when the bag is submerged in the liquid.

17. The method of claim 16 further comprising:
securing the bag to the rack with the opposed sidewalls spaced apart from each other at the opening, the bag including a gusset, the gusset positioned on the bag opposite the open end and joining the opposed sidewalls.

18. The method of claim 17 further comprising providing the gusset with a first tab and a second tab, and providing increased heat transfer between the liquid and the interior of the sealed portion of the container by securing the first tab and second tab to the rack with the first tab spaced from the second tab to increase the surface area of the lower portion of the bag in contact with the liquid.

19. The method of claim 2 further comprising providing a heating device to maintain the liquid at an elevated temperature above ambient temperature.

20. The method of claim 19 wherein the heating device maintains the temperature of the liquid at a temperature of 150° F. or greater.

* * * * *